United States Patent
Mani et al.

(10) Patent No.: US 10,868,876 B2
(45) Date of Patent: Dec. 15, 2020

(54) AUTHENTICATED SERVICE DISCOVERY USING A SECURE LEDGER

(71) Applicant: Cisco Technology, Inc., San Jose, CA (US)

(72) Inventors: Selvaraj Mani, Milpitas, CA (US); Shwetha Subray Bhandari, Bangalore (IN); Rakesh Reddy Kandula, Bengaluru (IN); Saiprasad Muchala, Bangalore (IN); Swapna Gopalkrishna Shingre, Newark, CA (US); Srinivasu Angadala, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 309 days.

(21) Appl. No.: 16/100,830

(22) Filed: Aug. 10, 2018

(65) Prior Publication Data

US 2020/0053169 A1   Feb. 13, 2020

(51) Int. Cl.
*H04L 29/08* (2006.01)
*H04L 29/06* (2006.01)
(Continued)

(52) U.S. Cl.
CPC .......... *H04L 67/16* (2013.01); *G06F 16/1805* (2019.01); *H04L 61/1511* (2013.01); *H04L 63/08* (2013.01)

(58) Field of Classification Search
CPC ..... H04L 67/16; H04L 63/08; H04L 61/1511; H04L 61/1541; H04L 67/12; G06F 16/1805

See application file for complete search history.

(56) References Cited

U.S. PATENT DOCUMENTS 9,479,517 B2 * 10/2016 Anand ................... H04L 67/16
10,305,862 B2 * 5/2019 Bone ..................... H04W 4/70
(Continued)

FOREIGN PATENT DOCUMENTS

WO   WO-2017187397 A1   11/2017

OTHER PUBLICATIONS

Khan, et al., "IoT Security: Review, Blockchain Solutions, and Open Challenges", 2017, 33 pages, Future Generation Computer Systems.

(Continued)

*Primary Examiner* — Mohammed Waliullah
(74) *Attorney, Agent, or Firm* — Behmke Innovation Group LLC; James M. Behmke; Jonathon P. Western (57) ABSTRACT

In one embodiment, a service configured to execute on trusted participant devices authenticates network service devices each having identifying information and one or more offered services, and creates an entry into a secure digital ledger for each authenticated network service device and associated offered services, each entry based on the identifying information and the one or more offered services for a corresponding network service device. Upon receiving an advertisement for an advertised service from an advertising device attached to a given trusted participant device, the service then requests and may receive an authentic ledger entry from the secure digital ledger for the advertised service. In response to either validating or failing to validate authenticity of the advertised service based on the authentic ledger entry, registration at the given trusted participant device of the advertised service for the received advertisement from the advertising device may either be permitted or denied, respectively.

20 Claims, 8 Drawing Sheets

(51) Int. Cl.
    *H04L 29/12*         (2006.01)
    *G06F 16/18*         (2019.01)

(56) References Cited

U.S. PATENT DOCUMENTS

| | | | |
|---|---|---|---|
| 10,554,412 B2* | 2/2020 | Subramanian | H04L 9/0637 |
| 10,601,834 B2* | 3/2020 | Qiu | H04L 29/06068 |
| 10,657,225 B2* | 5/2020 | Kilpatrick | H04M 15/00 |
| 10,693,636 B2* | 6/2020 | Watanabe | H04L 9/3297 |
| 2016/0275461 A1 | 9/2016 | Sprague et al. | |
| 2017/0302663 A1 | 10/2017 | Nainar et al. | |
| 2019/0163912 A1* | 5/2019 | Kumar | G06F 8/65 |

OTHER PUBLICATIONS

Kshetri, Nir., "Can Blockchain Strengthen the Internet of Things?", IEEE IT Professional (19)4, 68-72, 2017, IEEE.

Rafiee, H., "Multicast DNS (mDNS) Threat Model and Security Consideration", <draft-rafiee-dnssd-mdns-threatmodel-01>, DNSSD Internet-Draft, 11 pages, Oct. 27, 2014, IETF Trust.

"Name (mDNS) Poisoning Attacks Inside the LAN", http://www.gnucitizen.org/blog/name-mdns-poisoning-attacks-inside-the-lan/index.html, Jan. 23, 2008, 2 pages, Gnucitizen.

\* cited by examiner

AUTHENTICATED SERVICE DISCOVERY USING A SECURE LEDGER

TECHNICAL FIELD

The present disclosure relates generally to computer networks, and, more particularly, to authenticated service discovery using a secure ledger.

BACKGROUND

Service advertisement and discovery is one common practice for devices to learn about the networked services available within a computer network (e.g., an enterprise network). The multicast Domain Name Service (mDNS) protocol is predominantly used in computer networks, particularly in enterprise "Internet of Things" (IoT) networks, to announce/discover services, as it requires little to no administration or configuration in order to establish the service advertising network.

mDNS is based on the User Datagram Protocol (UDP) and is generally unsecured (no encryption or secure registration). As such, mDNS-based service discovery allows for service "spoofing" where any device can be configured to mimic a legitimate service owner. This can be dangerous, particularly in the case of enterprise IoT deployments where on-boarding users (e.g., "bring your own device" or BYOD scenarios) will be relying on the discovered service details from mDNS controller/network elements as authentic. That is, mDNS is particularly prone to "man-in-the-middle" (MITM) attacks due the nature of is protocol operation and corresponding limitations.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a service configured to execute on one or more trusted participant devices authenticates one or more network service devices each having identifying information and one or more offered services, and creates an entry into a secure digital ledger for each authenticated network service device and associated offered services, each entry based on the identifying information and the one or more offered services for a corresponding network service device. Upon receiving an advertisement for an advertised service from an advertising device attached to a given trusted participant device, the service then requests and may receive an authentic ledger entry from the secure digital ledger for the advertised service. In response to either validating or failing to validate authenticity of the advertised service based on the authentic ledger entry, registration at the given trusted participant device of the advertised service for the received advertisement from the advertising device may either be permitted or denied, respectively.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE 1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or performing any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

An enterprise network, on the other hand, is an entity's communications backbone (e.g., for a corporation, a college campus, and so on), that helps connect computers and related devices across departments and workgroup networks. One key purpose of an enterprise network is to eliminate isolated users and workgroups, where all systems should be able to communicate and provide and retrieve information. In scope, an enterprise network may include LANs and WANs, depending on operational and departmental requirements, and should be able to integrate all systems, including Windows and Apple computers and operating systems (OS), Unix systems, mainframes and related devices like smartphones and tablets. A tightly integrated enterprise network effectively combines and uses different device and system communication protocols.

Figure 1A:
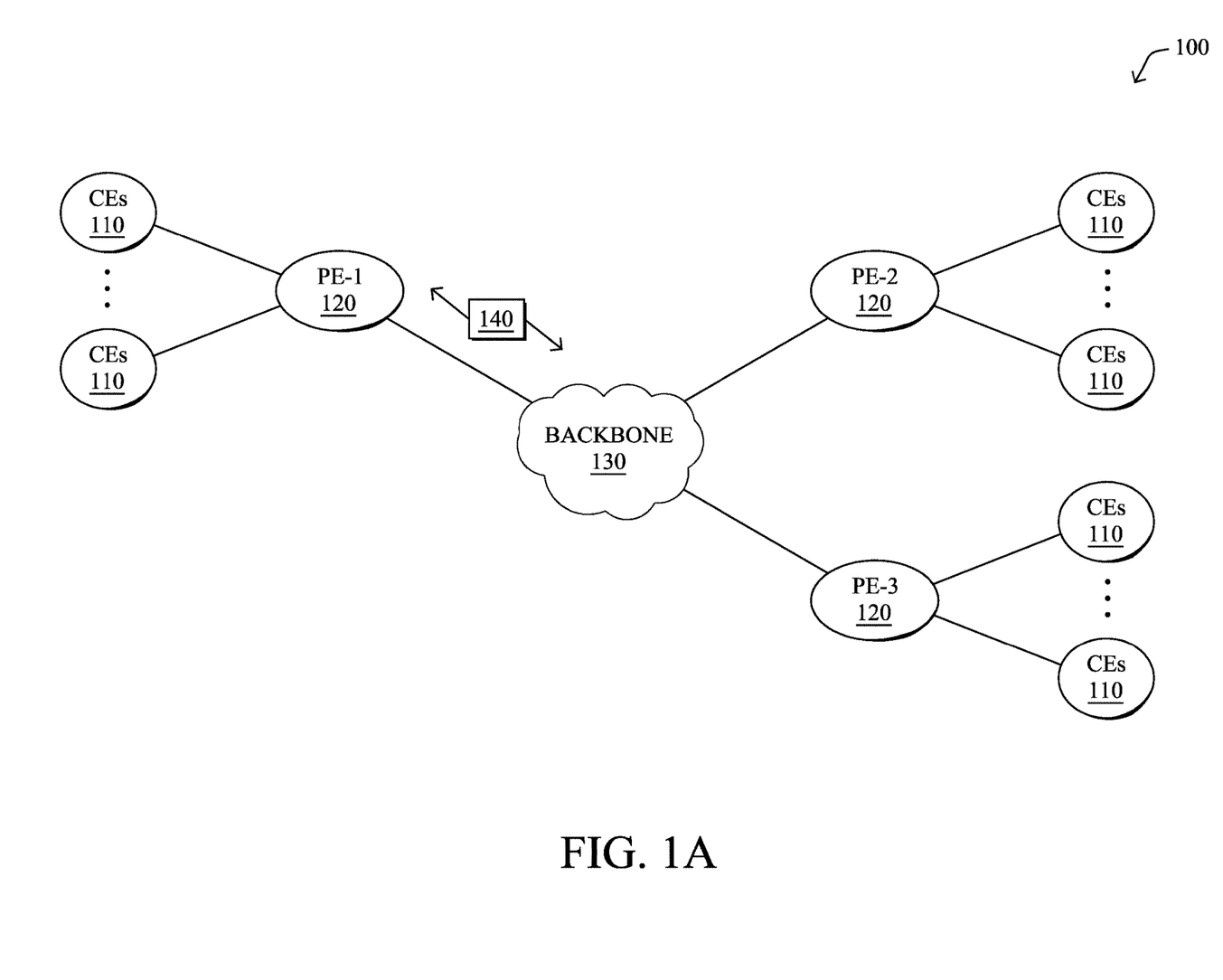
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

Figure 1B:
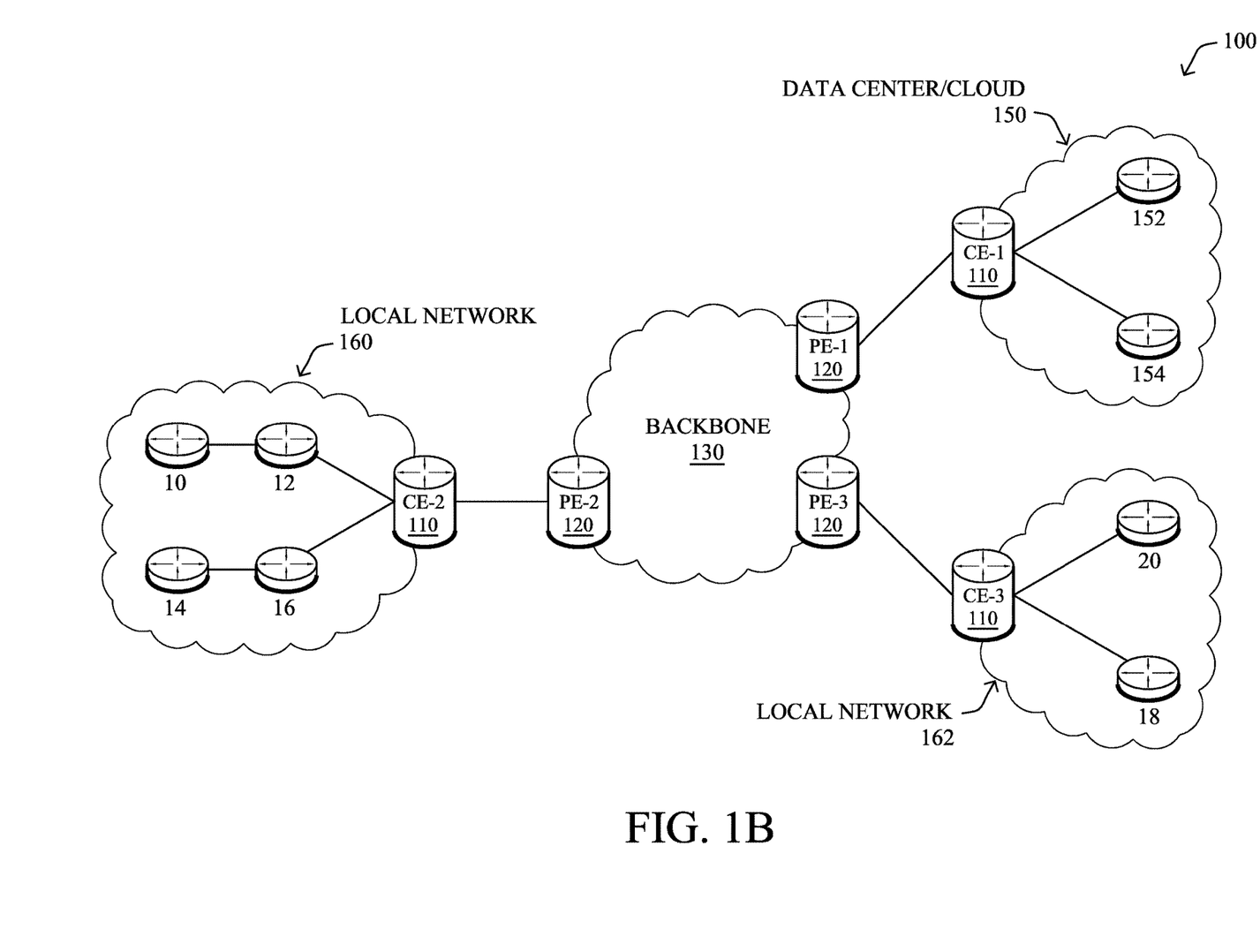

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations. Servers 152-154 may include, in various embodiments, any number of suitable servers or other cloud-based resources. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc. Furthermore, in various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators or other devices providing services, over a computer network (e.g., via IP), which may be the public Internet or a private network. Moreover, network 100 may include hybrid configurations, such as enterprise IoT networks, where an enterprise backbone network is built to support IoT device connectivity (e.g., "bring your own device" or BYOD systems), and so on.

Figure 2:
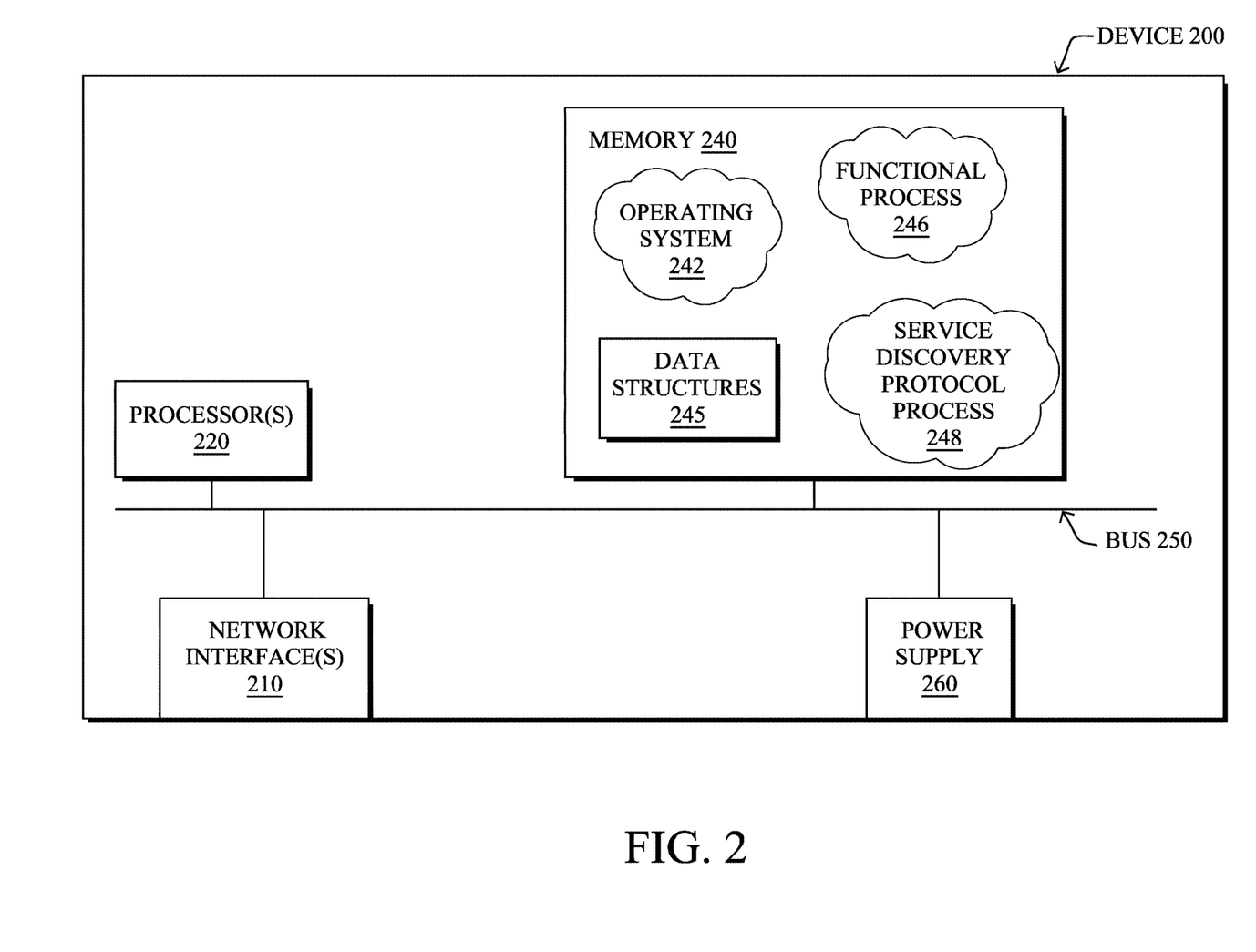
FIG. 2 illustrates an example network computing device.

FIG. 2 is a schematic block diagram of an example computing device 200 that may be used with one or more embodiments described herein e.g., as any of the devices shown in FIG. 1 above, and particularly as specific devices as described further below (e.g., servers, switches, distributed processes, cloud resources, and so on) or any other computing device with access to the operations of network. The device 200 may also be any other suitable type of device depending upon the type of network architecture in place, such as IoT nodes, etc. The device may comprise one or more network interfaces 210 (e.g., wired, wireless, cellular, etc.), at least one processor 220, and a memory 240 interconnected by a system bus 250, as well as a power supply 260 (e.g., battery, plug-in, etc.).

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative "service discovery protocol" process 248, as described herein. Notably, functional processes 246, when executed by processor(s) 220, cause each particular device 200 to perform the various functions corresponding to the particular device's purpose and general configuration. For example, a server would be configured to operate as a server, a switch would be configured to operate as a switch, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In various embodiments, device 200 may utilize machine learning techniques, which take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, for example, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DB-SCAN) and mean-shift, where a distance to a cluster is computed with the hope of reflecting a degree of anomaly (e.g., using a Euclidian distance and a cluster based local outlier factor that takes into account the cluster density).

In various embodiments, the anomaly detection mechanisms in network 100 may use Behavioral Analytics (BA). In general, BA refers to the use of advanced analytics coupled with networking technologies, to detect anomalies in the network. The ability to model the behavior of a device (networking switch/router, host, service device, etc.) allows for the detection of malware or other misbehaving or malicious devices or applications, which is complementary to the use of a firewall that uses static signatures. Observing behavioral changes (e.g., a deviation from modeled behavior) thanks to aggregated flows records, deep packet inspection, etc., may allow detection of an anomaly such as an horizontal movement (e.g. propagation of a malware, etc.), or an attempt to perform information exfiltration.

——Authenticated Service Discovery Using a Secure Ledger——

As noted above, service advertisement and discovery is one common practice for devices to learn about the networked services available within a computer network. In particular, in service discovery networks, a user or device must be able to find a service provided by one or more devices in the network. It usually does not matter to the user (or device) which device implements the service, as long as the service with specific properties is available and accessible. As an example, assuming a user needs to print a document in color, the user's device will send a discovery message into the network to learn the IP address and port number of a printer that can service the print job (e.g., using to the Internet Printing Protocol (IPP)), so that the document will be printed in color.

In general, a typical service discovery protocol consists of the following basic steps:
  An application or device that needs a certain service sends a request describing the required properties of the service to a specific multicast address (and port number).
  Other applications or devices on the same network receive the request, and if they provide the requested service themselves (or know another device that implements the service), respond with a message describing where the service can be found.
  The application or device searching for the service collects all responses, and from the responses chooses the one service provider it is going to use.

Additionally, devices that join or leave a network can send announcements to other devices describing the availability of the services they provide.

As further noted above, the multicast Domain Name Service (mDNS) is one predominant (and lightweight) multicast protocol that is frequently used for service announcements and discovery (e.g., a service advertisement protocol), where packets (typically, a UDP packets) are sent to a multicast address and are received by all hosts listening to that specific address, as described above. Since mDNS is based on the User Datagram Protocol (UDP), however, it is generally unsecured (no encryption or secure registration), and as such, mDNS-based service discovery allows for service "spoofing" where any device can be configured to mimic a legitimate service owner, offering the opportunity for "man-in-the-middle" (MITM) attacks. For example, a laptop (e.g., at a local switch or across VLANs through mDNS proxy protocols) could fool applications/devices looking for a printer by merely advertising "I'm a printer, I can do this print service, and you can connect with me on this address". Without proper authentication, the requesting applications/devices must simply assume that discovered to service details are authentic, and could unknowingly be tricked into establishing a connection with the malicious laptop.

The techniques herein, therefore, propose the establishment of a secure service discovery network (e.g., in an illustrative enterprise IoT network or any suitable computer network) through the use of a secure digital ledger (e.g., blockchain) for secure service registrations, service transfers, and service discovery. In certain embodiments, behavioral analytical validators can further be used for service auditing and usage analysis. Said differently, the techniques herein propose the use of a secure digital ledger (e.g., blockchain) for service advertisements for secure service discovery, avoiding the possibility of service name poisoning (spoofing).

Illustratively, the techniques described herein may be performed by hardware, software, and/or firmware, such as in accordance with the service discovery protocol process 248, which may include computer executable instructions executed by the processor 220 to perform functions relating to the techniques described herein, e.g., in conjunction with one or more other devices configured to perform respective components of the techniques herein.

Operationally, the techniques herein address the many security challenges with using mDNS as a network service discovery protocol (particularly in enterprise IoT), but not only for avoiding network service spoofing and MITM attacks, but also while still allowing for secure replacement (changing or upgrading a device providing a service, that is, having different identities and supporting the same service type and name) and secure roaming (a service device moving from one location in the network to another). Through the newly defined use of a secure digital ledger, such as blockchain ledger technology, the techniques defined herein can advance unsecure service advertisement and discovery protocols into a secure platform.

Figure 3:
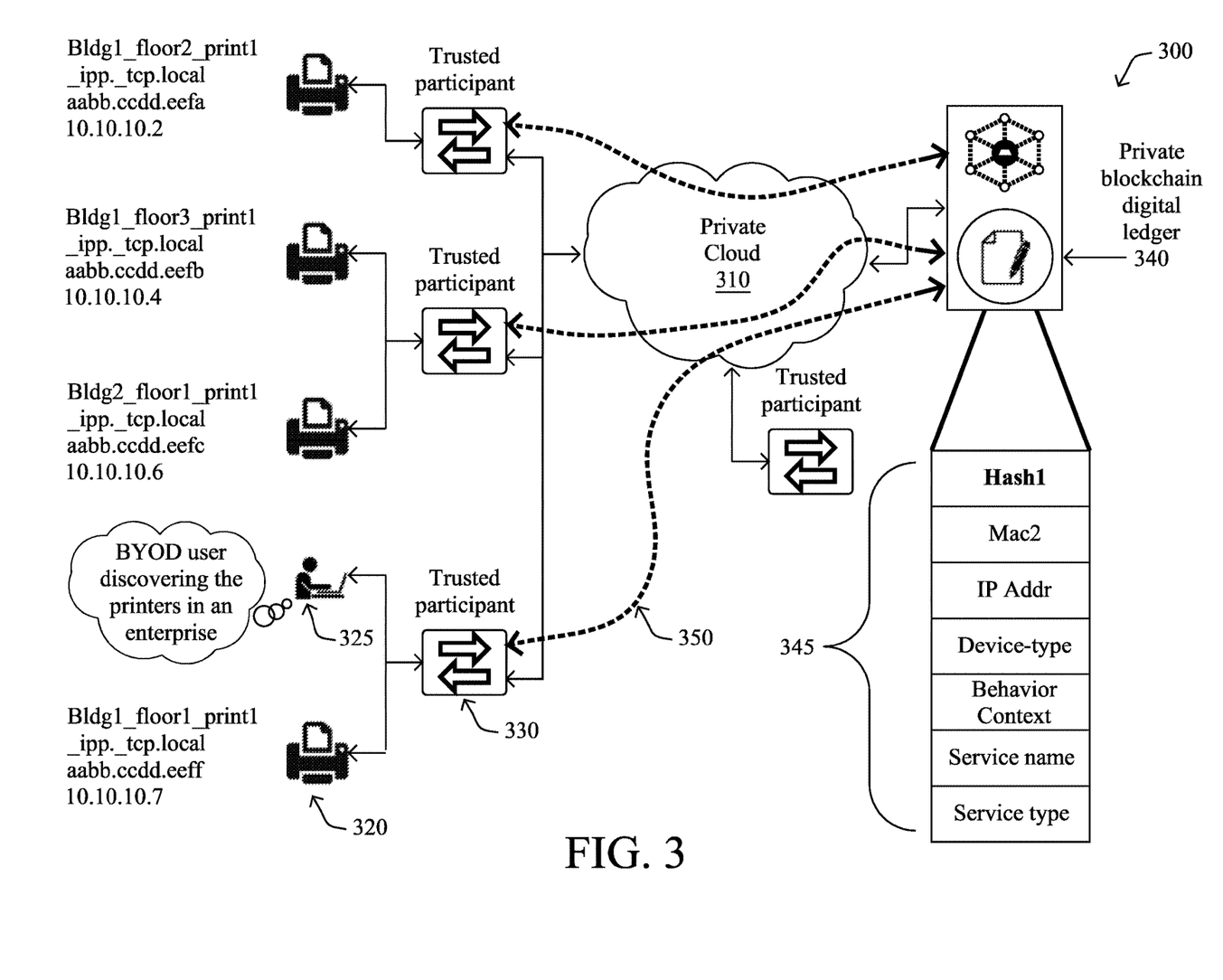
FIG. 3 illustrates an example of authenticated service discovery using a secure ledger in a network.

FIG. 3 illustrates an example simplified computer network topology 300 for authenticated service discovery using a secure ledger as described herein. As shown, a private cloud 310 may consist of any suitable computer network and associated protocol(s), such as a LAN, VLAN, wireless network, and so on, as will be appreciated by those skilled in the art, and may be for any purpose, such as Enterprise IoT, educational campuses, medical facilities, etc. According to service discovery protocol operation, service devices 320 are devices such as printers, copiers, scanners, cameras, sensors, actuators, microservice devices, computer networking service devices (e.g., firewalls, packet inspection, etc.), and many others that provide some service that a device 325 could be interested in (e.g., a BYOD user discovering printers in an enterprise, as illustrated, though any type of discovery device 325 could participate, whether related to a user or else fully autonomous).

According to the techniques herein, network elements (e.g., edge switches, routers, access points, etc.) are registered as "trusted participants" 330 within the configured network infrastructure for a secure digital ledger 340. Though one suitable secure digital ledger format is a private blockchain digital ledger, other suitable ledger formats and protocols may be used herein.

New service devices 320 which announce a network service (e.g., a printer as _ipp._tcp.local) are deployed onto the network through a connected trusted participant, where the trusted participant (e.g., edge switch) authenticates the device. In this "pre-provisioning" stage, authentication may take place using one or more of a variety of authentication protocols, such as IEEE 802.1X (dot1x), MAC authentication bypass (MAB), and web authentication (WebAuth). For instance, identifying information of the service device, such as MAC address, IP address, or other identities or metadata like username, serial number, device identity (ID), device make and model, and so on, may be obtained from the service device and exchanged with an authentication services (e.g., an identity services engine or "ISE").

In addition to the authorization profile for the service device that is getting authenticated, the network element also downloads a service profile indicating all of the "offered services" that can be supported by this device. For example, devices may dynamically be configured for various services, or else a static assignment of offered services may be correlated to device type.

According to the techniques herein, the network element can now register the identities (e.g., MAC, IP, metadata, etc.) as a valid network service provisioning device along with the service type with the secure digital ledger 340 (communication exchange 350). In this manner, each ledger entry (or "block") 345 within the ledger 340 will have (fully stored or as a hash) the identities of the device (e.g., MAC, IP, device type) and the service that is owned by the device (e.g., service name, service type).

In addition to identities and services, the techniques herein may also include a "behavioral context" within each entry 345. In particular, the techniques herein may include a component of "behavioral validation", where the trusted participants 330 (or other device with adequate visibility) monitor the behavior of the service device 320 to ensure that nothing "out of the ordinary" or "out of character" is observed. As a simple example, printers should receive print jobs and complete print jobs, and should not attempt to access secure data repositories or edit locally stored files. More subtle behavioral differences may also be noticed through advanced machine learning techniques and anomaly detection. Any behaviors by a service device that are not validated may be blocked on either a behavioral basis (e.g., continuing to allow the device to operate on the network but with restrictions) or else as a whole (e.g., denying access to the network for the misbehaving device). Simply put, the techniques herein may behaviorally validate a given service device based on whether the given service device performs "as expected" (e.g., registered services) or otherwise (e.g., "unregistered services", that is, services or actions that are not the expected services or even performing expected services in unexpected ways), and may treat the device accordingly.

With the service device authentication and ledger entries created above, the techniques herein may now detect and prevent spoofed services. In particular, and with reference generally to FIG. 4, assume that service 'x' with identity 'i1' is attached to the network device (trusted node) D1 (e.g., the printer at 10.10.10.2 registered as described in FIG. 3 above). As detailed above, during an initial "mining" stage, trusted participant D1 creates a ledger entry for service 'x' with identity 'i1', which is registered in the secure digital ledger. Now assume that a device 420 tries to advertise service 'x' with its different identity 'i2' onto the network (e.g., in response to a discovery request by the user device 325). The trusted entity (switch) D2 in the network will intercept the advertisement and will request the ledger for the authenticity of the service from device 420. However, the ledger lookup 450 to validate the new transaction will fail, so the service registration will be denied. Specifically, the ledger returns the entry/block which has the original identity of the device creating the entry (e.g., 'i1'), and thus the identity of 'i2' will mismatch, and be denied.

Figure 4:
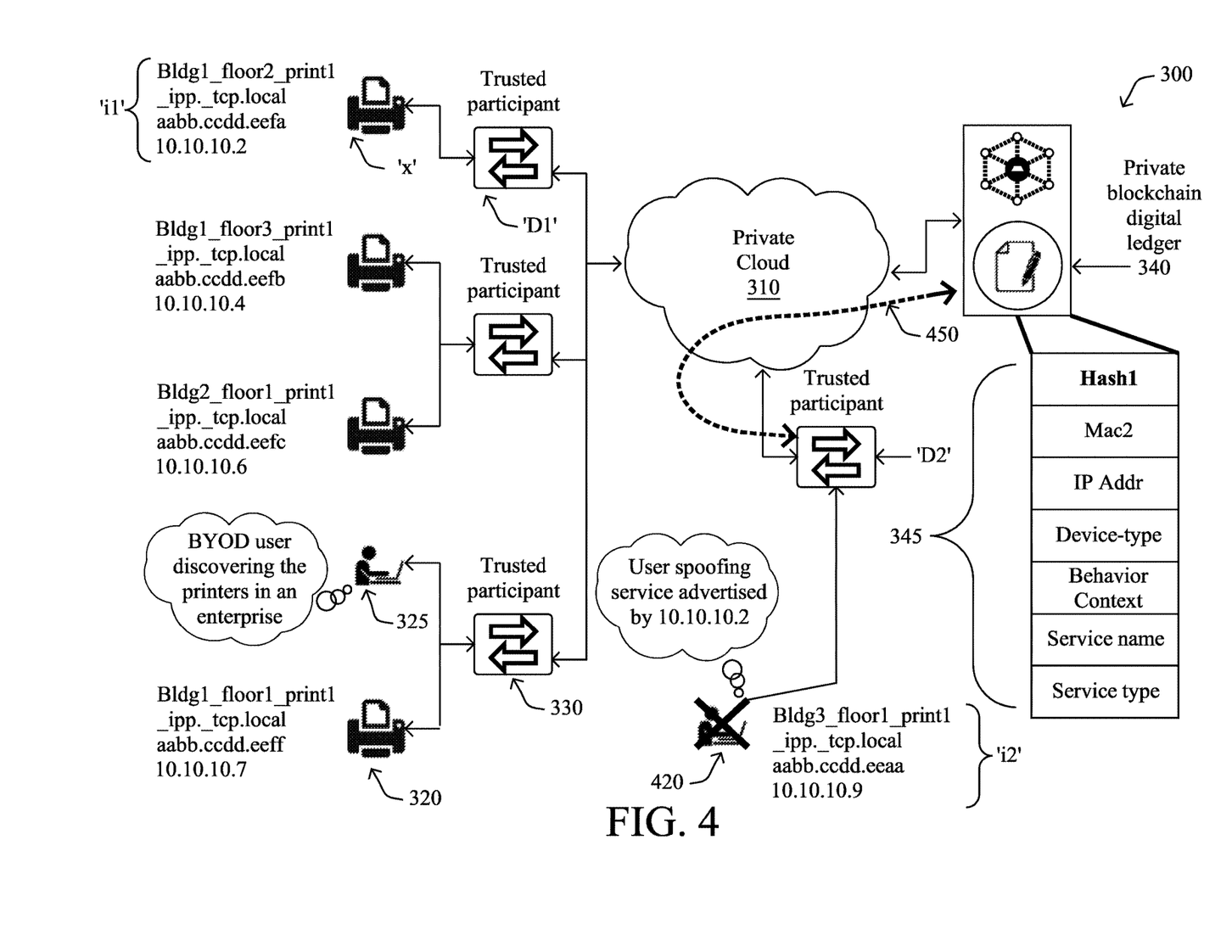
FIG. 4 illustrates an example of service spoofing prevention.

Note that in certain embodiments, statistics of the validations of advertising devices (e.g., the rejections/denials in particular) may be stored (e.g., cached) on each trusted participant, and may be propagated across the network (e.g., to other trusted participants), for future evaluations. For example, past failure analysis can be helpful not only for flagging 'i2' as a potentially malicious device in case further attempts are made from different locations, but also for the behavioral validators mentioned above.

According to the techniques herein, the newly defined use of a secure digital ledger for service authentication also provides for secure service transfer (same service, different device) and service roaming (same service and same device, but different network location) without permitting duplicates.

Figure 5:
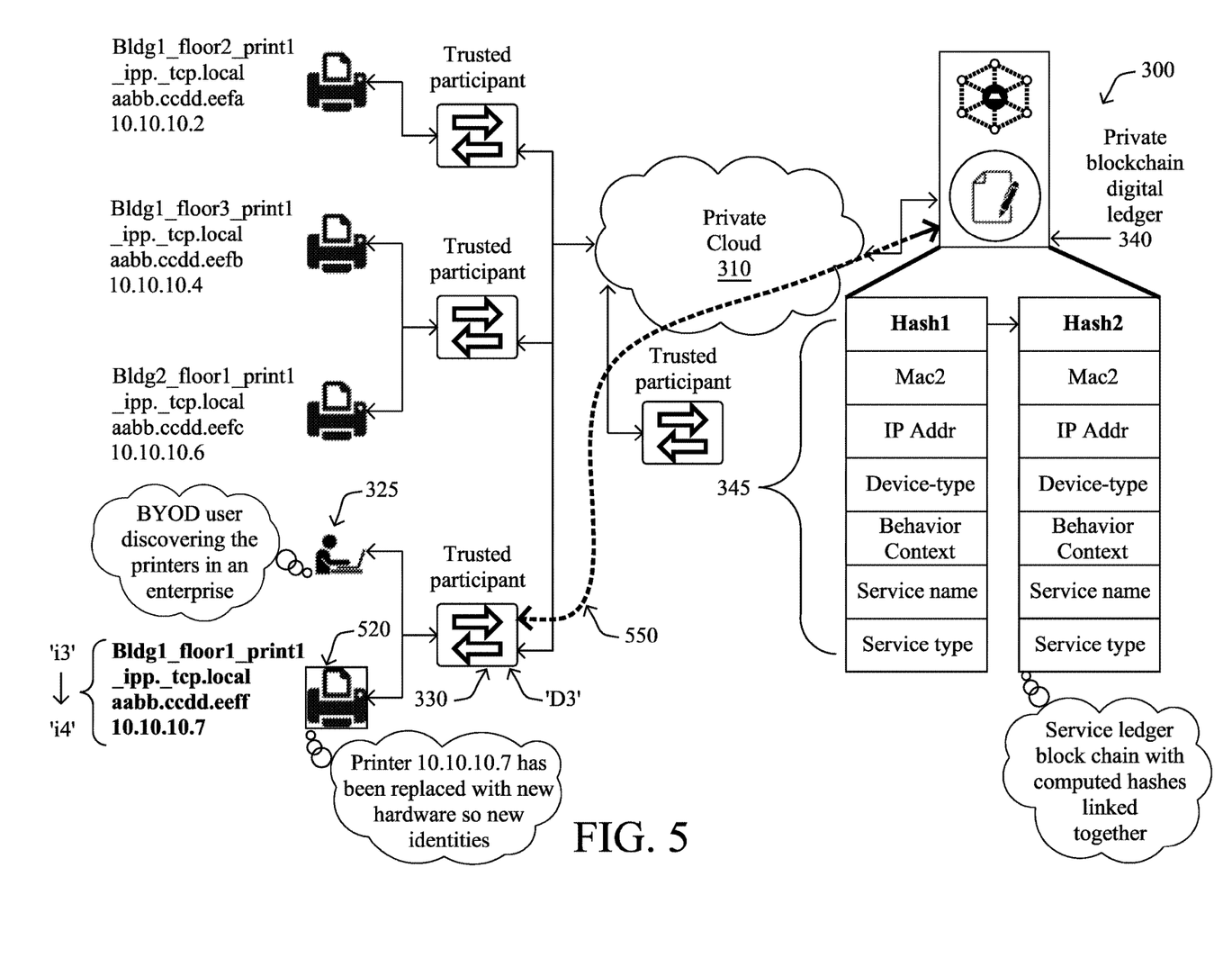
FIG. 5 illustrates an example of service transfer or roaming.

First, with regard to service transfer (e.g., a replacement device for a previously registered service), and with reference generally to FIG. 5, assume that a device with identity 'i3' was attached to node D3 is replaced with a new service device 520 with identity 'i4' and still attached to D3 (e.g., upgrading from an older model printer to a newer model). As described above, device with identity 'i4' will be authenticated against D3 as described above, and a new ledger entry 345 will be established ("Hash 2") based on the new information (via ledger exchange 550). That is, the trusted participant device may query the ledger for a block with 'i4' and since there is no existing entry, may locally create a transaction block (e.g., "B2") while behavioral validators validate the device behavior. When the service device 'i4' advertises service 'x' onto the network, the trusted participant D3 queries the ledger for an existing entry with service 'x', and the ledger returns the previously created block matching the service 'x' (e.g., "B1"). As such, the trusted participant and secure digital ledger chain the previous block (B1) to the newly created block (B2) ("Hash 1"→"Hash 2", where B2 is a next mined block to B1), such that any future query about the service 'x' ledger can return 'B1'→'B2' which denotes the transfer information context about the identities 'i3' and 'i4' for the service 'x'. (Additionally, as described above, any available behavioral validator context and/or local block context can be obtained for 'i4' from neighbor devices such as other trusted nodes or ISE servers.)

Second, with regard to service roaming detection, assume, for example, that the device with identity 'i1' advertising service 'x' did actually move from trusted participant D1 to new trusted participant D2 (e.g., moving a printer from one company building to another). In this instance, the device with identity 'i1' will be authenticated against D2 as described above, and the device attaches to trusted node D2. Here, node D2 will create a block of transaction about the node mobility and adds it to the chain, similar to described above. That is, D2 propagates into the network the visibility of 'i1' at 'D2', and now the previous node 'D1' responds with the previous block created by 'D1'. (The behavioral validator on 'D1' may also send behavior context information to 'D2'.) D2 may now mine the transaction and adds a new entry for the new location to the chain entries as a valid block regarding the 'i1' roam event (e.g., with the behavior context embedded in the block). When the service device with identity 'i1' later advertises the service 'x' onto the network from the new D2 location, the trusted participant D2 would then query and receive the previous block and updated service roam transaction from the block chain, and would permit the advertisement.

Figure 6:
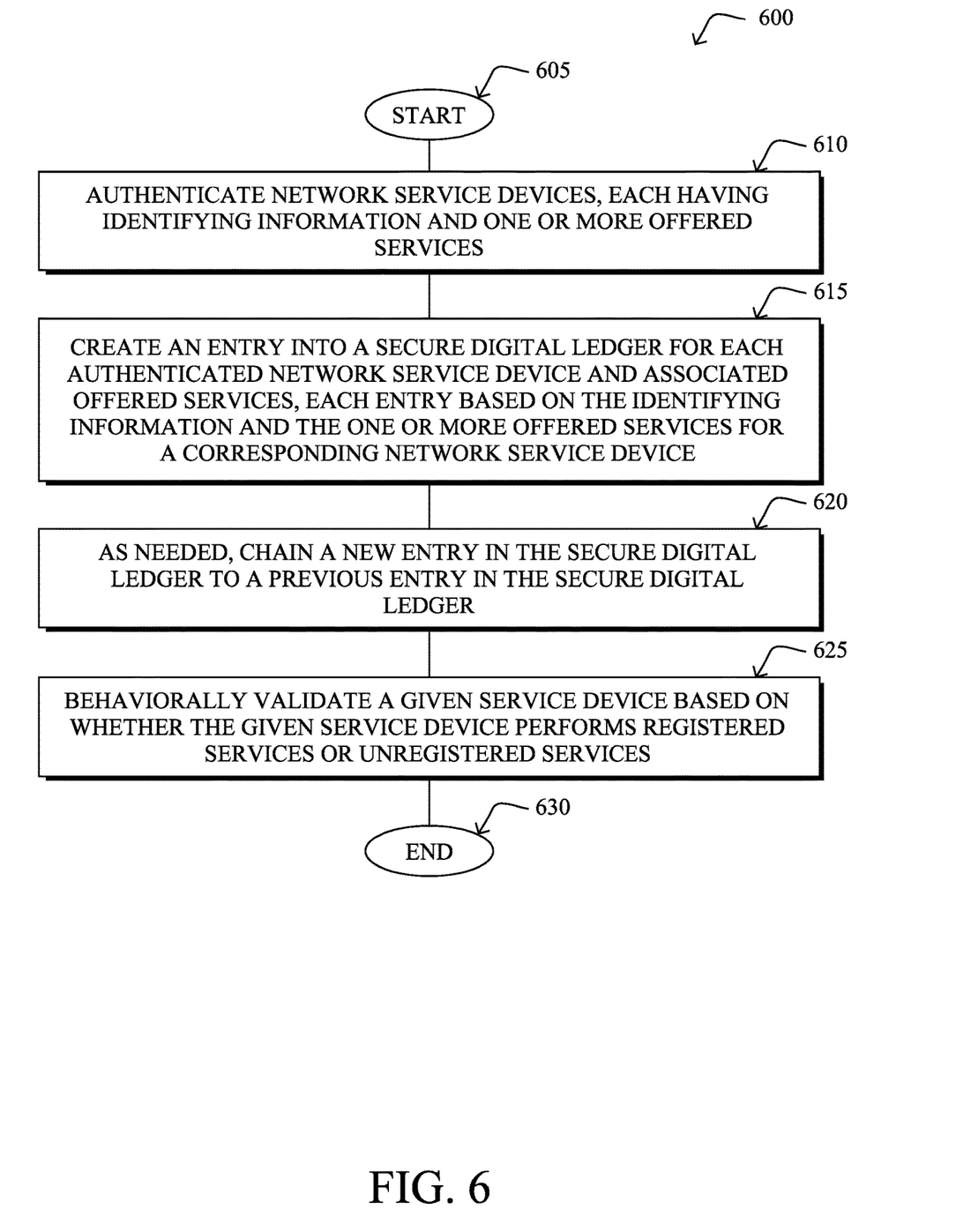
FIG. 6 illustrates an example simplified procedure for authenticated service discovery using a secure ledger in a network, particularly from the perspective of initializing ledger entries.

FIG. 6 illustrates an example simplified procedure for authenticated service discovery using a secure ledger in a network in accordance with one or more embodiments described herein, particularly from the perspective of initializing ledger entries. For example, a non-generic, specifically configured device (e.g., device 200, such as a switch or other trusted participant device 320) may perform procedure 600 by executing stored instructions (e.g., process 248). The procedure 600 may start at step 605, and continues to step 610, where, as described in greater detail above, a service executing on a trusted participant device authenticates one or more network service devices each having identifying information (e.g., MAC address, IP address, username, serial number, device make, device model, device ID, a device name, and so on) and one or more offered services (e.g., any service that could be advertised based on mDNS or other service advertisement protocols). As noted above, the authenticating may be based on one or more authentication protocols, such as dot1x/MAB/WebAuth and others.

For each authenticated network service device and associated offered service(s), in step 615 the service (the trusted participant in cooperation with the secure ledger 340) creates an entry 345 into the secure digital ledger (e.g., a blockchain block), each entry based on the identifying information and the one or more offered services for a corresponding network service device 320.

Notably, as needed, in step 620, new entries in the secure digital ledger may be chained to previous entries in the secure digital ledger. That is, as described above, in response to detecting a service transfer from an original service device for a particular offered service to a new service device, a new entry in the secure digital ledger for the particular offered service and new service device may be chained to a previous entry in the secure digital ledger for the advertised service and the original service device. Conversely, in response to detecting roaming of a given service device with a particular offered service from an original trusted participant device to a new trusted participant device, a new entry in the secure digital ledger for the particular offered service and given service device may be chained to a previous entry in the secure digital ledger created by the original trusted participant device. (Note further that in this instance, the original trusted participant device may exchange, to the new trusted participant device, behavioral context of the given service device for behavioral validation of the given service device.)

Additionally, in step 625, the service herein (e.g., a connected trusted participant device) may behaviorally validate a given service device based on whether the given service device performs registered services (e.g., those advertised/authenticated) or unregistered services (e.g., anything not advertised/authenticated, or generally anything out of the ordinary). In particular, various static rules may apply, such as strict limitations on behaviors that are allowed (or disallowed), or else in certain embodiments, various machine learning techniques may be used to detect changes in behavior, malicious behavior, anomalous behavior, and so on.

The simplified procedure 600 then ends in step 630, though notably with the ability to continue creating secure ledger entries for each new authenticated service device, and to continue to behaviorally analyze and validate device behavior, accordingly.

Figure 7:
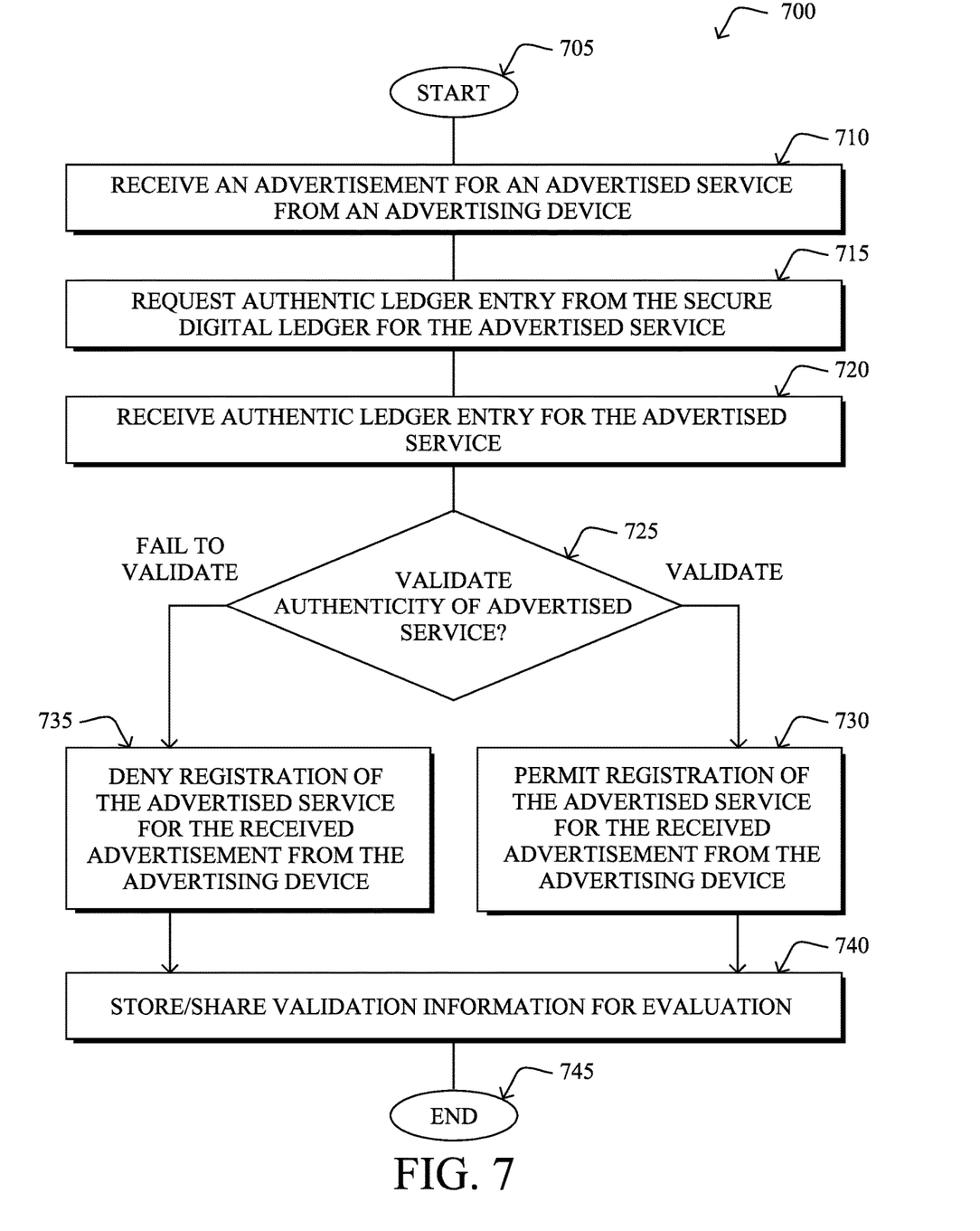
FIG. 7 illustrates another example simplified procedure for authenticated service discovery using a secure ledger in a network, particularly from the perspective of validating advertising devices.

In addition, FIG. 7 illustrates another example simplified procedure for authenticated service discovery using a secure ledger in a network in accordance with one or more embodiments described herein, particularly from the perspective of validating advertising devices. For example, a non-generic, specifically configured device (e.g., device 200, such as a switch or other trusted participant device, which may or may not be the same switch performing step 600 described in FIG. 6 above) may perform procedure 700 by executing stored instructions (e.g., process 248). The procedure 700 may start at step 705, and continues to step 710, where, as described in greater detail above, an advertisement is received (or otherwise obtained) for an advertised service from an advertising device attached to a given trusted participant device. In step 715, the trusted participant device requests an authentic ledger entry from the secure digital ledger for the advertised service, and receives it (or otherwise obtains it) in step 720. (Notably, if no authentic ledger is received in step 720, then the procedure may simply move on to step 735 for failure to validate the advertised service.)

In step 725, the authenticity of the advertised service may be validated based on the authentic ledger entry. Namely, authenticity of the advertised service may be validated in response to the authentic ledger entry corresponding to the advertising device as an originating device of the authentic ledger entry, as described above (i.e., the identity information and service match the secure ledger entry). On the other hand, the system herein may fail to validate authenticity of the advertised service in response to the authentic ledger entry corresponding to an originating device of the authentic ledger entry that is not the advertising device (i.e., either the identity information or service do not match the secure ledger entry).

In response to validating the authenticity of the advertised service, in step 730 registration of the advertised service is permitted (service may be advertised/provided), while conversely, in response to failing to validate authenticity of the advertised service, in step 735 registration may be denied (preventing service spoofing). Optionally, in step 740, validation information may be stored (e.g., and shared) for evaluation as described above, including behavioral evaluation or other statistical uses.

The simplified procedure 700 may then end in step 745, notably with the ability to continue to receive further advertisements and to further validate the authenticity of the service advertisements, accordingly.

It should be noted that while certain steps within procedures 600-700 may be optional as described above, the steps shown in FIGS. 6-7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600-700 are described separately, certain steps from each procedure may be incorporated into each other procedure, and the procedures are not meant to be mutually exclusive. Furthermore, the procedures, while described separately and while each may be performed by a separate device, may be performed by a collective service advertisement/discovery "service", that is, by a service configured to execute on one or more trusted participant devices (or other devices, such as servers, etc.).

The techniques described herein, therefore, provide for authenticated service discovery using a secure ledger. In particular, according to the techniques herein, provide for secure service registration, service browsing, and service transfer in a manner that greatly increases confidence in the authenticity of the browsed service, especially in an enterprise IoT network. Moreover, the techniques herein can use behavioral validators in the blockchain context to increase the trust score of a mined block, and also allow for the reuse of behavioral contexts securely across device replacements within the network. Note also that while previous techniques may use secure ledgers to detect spoofed devices, the techniques herein specifically solve service leakage and prevent service spoofing in computer networks. Furthermore, the techniques herein seamlessly allow for secure roaming and transfer of either services or service devices.

While there have been shown and described illustrative embodiments that provide for authenticated service discovery using a secure ledger, it is to be understood that various other adaptations and modifications may be made within the spirit and scope of the embodiments herein. For example, while certain embodiments are described herein with respect to using certain protocols (e.g., mDNS, UDP, blockchain, authentication protocols, etc.), the techniques herein are not limited as such and may be used with other protocols, in other embodiments. In addition, while certain device configurations are shown, such as trusted participant devices being edge devices (e.g., switches), secure ledgers stored on servers, and so on, other suitable configurations may be used according to the functionality of the techniques herein, accordingly. Moreover, the techniques herein are not limited to enterprise IoT networks, and may also work for other types of networks employing service discovery or similar mechanisms, such as plug-and-play networks or systems.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    authenticating, by a service configured to execute on one or more trusted participant devices, one or more network service devices each having identifying information and one or more offered services;
    creating, by the service, an entry into a secure digital ledger for each authenticated network service device and associated offered services, each entry based on the identifying information and the one or more offered services for a corresponding network service device;
    receiving, by the service, an advertisement for an advertised service from an advertising device attached to a given trusted participant device;
    requesting, by the service, an authentic ledger entry from the secure digital ledger for the advertised service;
    receiving, by the service, the authentic ledger entry for the advertised service;
    in response to validating authenticity of the advertised service based on the authentic ledger entry, permitting, by the service, registration at the given trusted participant device of the advertised service for the received advertisement from the advertising device; and
    in response to failing to validate authenticity of the advertised service based on the authentic ledger entry, denying, by the service, registration at the given trusted participant device of the advertised service for the received advertisement from the advertising device.

2. The method as in claim 1, further comprising:
    validating authenticity of the advertised service in response to the authentic ledger entry corresponding to the advertising device as an originating device of the authentic ledger entry; and
    failing to validate authenticity of the advertised service in response to the authentic ledger entry corresponding to an originating device of the authentic ledger entry that is not the advertising device.

3. The method as in claim 1, further comprising:
    behaviorally validating a given service device based on whether the given service device performs registered services or unregistered services.

4. The method as in claim 1, further comprising:
digressing a service transfer from an original service device for a particular offered service to a new service device; and
chaining a new entry in the secure digital ledger for the particular offered service and new service device to a previous entry in the secure digital ledger for the advertised service and the original service device.

5. The method as in claim 1, further comprising:
detecting roaming of a given service device with a particular offered service from an original trusted participant device to a new trusted participant device; and
chaining a new entry in the secure digital ledger for the particular offered service and given service device to a previous entry in the secure digital ledger created by the original trusted participant device.

6. The method as in claim 5, further comprising:
exchanging, from the original trusted participant device to the new trusted participant device, behavioral context of the given service device for behavioral validation of the given service device.

7. The method as in claim 1, further comprising:
storing validation information for evaluation.

8. The method as in claim 1, wherein the secure digital ledger is based on blockchain.

9. The method as in claim 1, wherein the advertised service is based on a multicast domain name service (mDNS) protocol.

10. The method as in claim 1, wherein identifying information is selected from a group consisting of: media access control (MAC) address; Internet Protocol (IP) address; username; serial number; device make; device model; device identifier (ID); and a device name.

11. The method as in claim 1, wherein authenticating is based on one or more protocols selected from a group consisting of: IEEE 802.1X (dot1x); MAC authentication bypass (MAB); and web authentication (WebAuth).

12. A tangible, non-transitory, computer-readable medium storing program instructions that cause a computer to execute a process comprising:
 authenticating one or more network service devices each having identifying information and one or more offered services;
 creating an entry into a secure digital ledger for each authenticated network service device and associated offered services, each entry based on the identifying information and the one or more offered services for a corresponding network service device;
 receiving an advertisement for an advertised service from an advertising device attached to a given trusted participant device;
 requesting an authentic ledger entry from the secure digital ledger for the advertised service;
 receiving the authentic ledger entry for the advertised service;
 in response to validating authenticity of the advertised service based on the authentic ledger entry, permitting registration at the given trusted participant device of the advertised service for the received advertisement from the advertising device; and
 in response to failing to validate authenticity of the advertised service based on the authentic ledger entry, denying registration at the given trusted participant device of the advertised service for the received advertisement from the advertising device.

13. The computer-readable medium as in claim 12, wherein the process further comprises:

validating authenticity of the advertised service in response to the authentic ledger entry corresponding to the advertising device as an originating device of the authentic ledger entry; and
failing to validate authenticity of the advertised service in response to the authentic ledger entry corresponding to an originating device of the authentic ledger entry that is not the advertising device.

14. The computer-readable medium as in claim 12, wherein the process further comprises:
behaviorally validating a given service device based on whether the given service device performs registered services or unregistered services.

15. The computer-readable medium as in claim 12, wherein the process further comprises:
detecting a service transfer from an original service device for a particular offered service to a new service device; and
chaining a new entry in the secure digital ledger for the particular offered service and new service device to a previous entry in the secure digital ledger for the advertised service and the original service device.

16. The computer-readable medium as in claim 12, wherein the process further comprises:
detecting roaming of a given service device with a particular offered service from an original trusted participant device to a new trusted participant device; and
chaining a new entry in the secure digital ledger for the particular offered service and given service device to a previous entry in the secure digital ledger created by the original trusted participant device.

17. An apparatus, comprising:
 one or more network interfaces to communicate with a computer network;
 a processor coupled to the network interfaces and configured to execute one or more process; and
 a memory configured to store a process executable by the processor, the process when executed configured to:
  authenticate one or more network service devices each having identifying information and one or more offered services;
  create an entry into a secure digital ledger for each authenticated network service device and associated offered services, each entry based on the identifying information and the one or more offered services for a corresponding network service device;
  receive an advertisement for an advertised service from an advertising device attached to a given trusted participant device;
  request an authentic ledger entry from the secure digital ledger for the advertised service;
  receive the authentic ledger entry for the advertised service;
  in response to validating authenticity of the advertised service based on the authentic ledger entry, permit registration at the given trusted participant device of the advertised service for the received advertisement from the advertising device; and
  in response to failing to validate authenticity of the advertised service based on the authentic ledger entry, deny registration at the given trusted participant device of the advertised service for the received advertisement from the advertising device.

18. The apparatus as in claim 17, wherein the process when executed is further configured to:

validate authenticity of the advertised service in response to the authentic ledger entry corresponding to the advertising device as an originating device of the authentic ledger entry; and fail to validate authenticity of the advertised service in response to the authentic ledger entry corresponding to an originating device of the authentic ledger entry that is not the advertising device.

19. The apparatus as in claim 17, wherein the process when executed is further configured to:

behaviorally validate a given service device based on whether the given service device performs registered services or unregistered services.

20. The apparatus as in claim 17, wherein the process when executed is further configured to:

chain a new entry in the secure digital ledger to a previous entry in the secure digital ledger.

* * * * *

UNITED STATES PATENT AND TRADEMARK OFFICE
CERTIFICATE OF CORRECTION

PATENT NO. : 10,868,876 B2  
APPLICATION NO. : 16/100830  
DATED : December 15, 2020  
INVENTOR(S) : Selvaraj Mani et al.

Page 1 of 1

It is certified that error appears in the above-identified patent and that said Letters Patent is hereby corrected as shown below:

In the Specification

Column 6, Line 14, should read:
the Internet Printing Protocol (IPP)), so that the document Column 6, Line 50, should read:
applications/devices must simply assume that discovered Column 10, Line 33, should read:
thing not advertised/authenticated, or generally anything Signed and Sealed this  
Sixteenth Day of March, 2021

Drew Hirshfeld  
*Performing the Functions and Duties of the*  
*Under Secretary of Commerce for Intellectual Property and*  
*Director of the United States Patent and Trademark Office*